United States Patent [19]

Bennett

[11] 4,399,203

[45] Aug. 16, 1983

[54] SULFIDE AND SELENIDE COMPOSITIONS

[75] Inventor: Phillip D. Bennett, Cleveland Heights, Ohio

[73] Assignee: The Standard Oil Company, Cleveland, Ohio

[21] Appl. No.: 368,789

[22] Filed: Apr. 15, 1982

[51] Int. Cl.$^3$ .............................................. H01M 6/18
[52] U.S. Cl. .................................. 429/191; 429/199; 252/62.2; 423/463; 423/466; 423/467; 423/508; 423/511
[58] Field of Search .......................... 429/191, 33, 199; 423/463, 466, 467, 508, 511; 252/62.2, 182.1, 518; 106/286.2, 286.5, 286.7

[56] References Cited

U.S. PATENT DOCUMENTS 4,367,267   1/1983   Oi ..................................... 429/191 X

*Primary Examiner*—Charles F. LeFevour
*Attorney, Agent, or Firm*—Salvatore P. Pace; Herbert D. Knudsen; Larry W. Evans

[57] ABSTRACT

Novel sulfide, polysulfide, selenide and polyselenide compositions are provided which are useful as ionic conducting solid electrolytes. Electrical energy storage devices utilizing such electrolytes are also provided.

10 Claims, No Drawings

SULFIDE AND SELENIDE COMPOSITIONS

BACKGROUND OF THE INVENTION

1. Field of the Invention

The present invention relates to novel sulfide, polysulfide, selenide and polyselenide compositions useful as solid electrolytes. More particularly, this invention relates to the sulfide, polysulfide, selenide and polyselenide compositions useful as ionic conducting solid electrolytes and electrical energy storage devices utilizing such electrolytes.

2. Description of Art:

Significant research is presently being conducted to develop new types of energy storage devices. One area of research receiving considerable emphasis is a search for better solid cation conductors which can be utilized in energy storage systems. Solid electrolytes may provide distinct advantages as compared with liquid electrolytes in the manufacturing of solid state high-energy storage devices. For example, the solid electrolyte eliminates many of the problems found in manufacturing energy storage devices with corrosive electrolytes. Further, the ionic conducting solid electrolytes can replace current molten salt electrolytes and be utilized at room temperatures.

The article *Ionic Conductivity of Solid Liquid LiAlCl₄* by W. Weppner et al. discloses the electrical conductivity of lithium chloroaluminate in a temperature range between room temperature and 180° C. The article *Negative Oxidation States of the Chalcogens in Molten Salts. 1. Raman Spectroscoptic Studies on Aluminum Chlorosulfides Formed in Chloride and Chloroaluminate Melts and Some Related Solid and Dissolved Compounds* by Rolf W. Berg et al. discloses Raman spectroscopic measurements on series of LiCl-CsCl and CsCl-AlCl₃ melts. Also disclosed therein is a novel sulfur-containing compound of the formula $CsAlSCl_2$. However, the use of these compounds as electrolytes was not discussed in this article. Finally, the article *Novel Materials for Advanced Batteries* by B. C. H. Steele disclose at page 371 non-crystalline lithium ion conductors of the formula $Li_2S-P_2S_5-LiI$ and polymeric ethylene oxides and propylene oxides incorporating lithium salts.

SUMMARY OF THE INVENTION

The present invention provides a novel compound of the formula:

$$[AlYZ_2]_n[A_aCs_b]_n \qquad (I)$$

wherein:
- Y is selected from the group consisting of S and Se;
- Z is selected from the group consisting of Cl, Br and I or combinations thereof;
- A is selected from the group consisting of Li, Na or K or combinations thereof;
- n is a positive integer;
- a is a number greater than 0.1,
- b is a number greater than 0.01 and the sum of a+b equals 1.

This invention also provides for the use of the composition of formula I as an ionic conducting solid electrolyte.

Electrical energy storage devices are also provided comprising:
(a) a housing;
(b) at least two electrodes, including a positive electrode and a negative electrode, positioned within said housing; and,
(c) an ionic conducting solid electrolyte disposed between and electrically contacting said electrodes wherein said ionic conducting solid electrolytes comprises a composition of the formula:

$$[AlYZ_2]_n[A_aCs_b]_n \qquad (I)$$

wherein:
- Y is selected from the group consisting of S and Se;
- Z is selected from the group consisting of Cl, Br and I or combinations thereof;
- A is selected from the group consisting of Li, Na or K or combinations thereof;
- n is a positive integer;
- a is a number greater than 0.1,
- b is a number greater than 0.01 and the sum of a+b equals 1.

DETAILED DESCRIPTION OF THE INVENTION

The compounds of the present invention are amorphous solid conductors of cations containing alkali cations selected from the group $Li^+$, $Na^+$ and $K^+$ or combinations thereof in combination with $Cs^+$ coordinated within a polymeric anionic structure. The polymeric anionic structure comprises (a) aluminum, (b) sulfur or selenium and (c) a halide selected from chloride, bromide or iodide or combinations thereof. Preferably, the polymeric anionic structure is composed of (a) aluminum, (b) sulfur and (c) chloride or bromide, with chloride being most preferred.

Although the exact structure of the amorphous or glass compounds have not been specifically identified, it is believed that the polymeric anionic structure is a ionic polymer represented by the repeating unit:

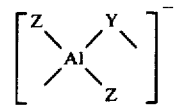

wherein Y and Z are defined as in formula (I) with the structure in chains or rings. The alkali cations are believed to individually and independently orient themselves about the units and counterbalance the negative charge of the anionic structure such that the compositions exhibit no net charge. The alkali cations are not believed to be in a bound form with other alkali cations.

The alkali cations used in the present invention are characterized by their atomic size and charge as compared to the cesium cation. Although the charge of the cations should be equal to the cesium cation, the size of the cations as defined by its ionic radius are preferably smaller than the cesium cation. Because of its small cationic size, lithium is most preferred. Although not intending to be bound to theory, it is believed that the smaller cations have greater mobility within the polymeric anionic structure as compared to the cesium cations. This greater mobility results in high ionic conductivities when subjected to potential differences across the compositions. Further, it is believed that the conduction of charged species is practically purely ionic and is attributed predominantly to the transport of cations.

The amorphous compositions of the present invention are prepared by mixing the elements or compounds containing the components of formula I at elevated temperatures. The components can be added in various forms including but not limited to metals, metal halides, alkali halides, elemental chalcogens, elemental halides and the like. The individual components are added in molar ratios of about 0.8–1.2 cation/0.8–1.2 Al/0.8–1.2 S or Se/1.8–2.2 halide and preferably, will be in molar ratios of about 1/1/1/2.

It is believed that the presence of cesium cations is necessary to provide the amorphous structure which allows high mobility of the smaller cations. This may result from the fact that the larger cesium cations contribute to the glass forming properties of these compositions. Generally, at least 1 percent of alkali cations utilized must be cesium in order to obtain the proper amorphous struction. Preferably, at least 10 percent of the alkali cations will be cesium.

The temperatures employed in preparing the amorphous compounds should be at least 550° C., preferably at least 650° C. and most preferably at least 750° C. The components are maintained at the elevated temperatures until a homogeneous viscous liquid is observed.

The pressure employed can vary widely. Typically, subatmospheric, atmospheric or superatmospheric pressures can be employed although subatmospheric pressures may be preferred when the compounds are prepared in sealed containers in order to avoid explosive pressures developing within the containers. Preferably, a vacuum is employed ranging from about $10^{-3}$ to about $10^{-6}$ atmospheres. Depending upon the apparatus employed, it may also be desirable to employ an inert atmosphere since the presence of oxygen and water is undesirable. Typically, the inert gases which may be employed include helium, argon, krypton, xenon, nitrogen and the like.

After heating the mixture until a homogeneous viscous liquid is formed, an amorphous compound is obtained by cooling the mixture to room temperature or below. Rapid cooling techniques such as those techniques used in the production of amorphous metals can also be employed. Further, it may be desirable to retain subatmospheric pressures and/or inert environments during cooling.

The amorphous compositions of this invention can be utilized as ionic conducting solid electrolytes in various electrical energy storage devices such as batteries, capacitors and the like. Typically, the solid electrolytes are employed in electrical energy storage devices containing at least two electrodes, a positive electrode and a negative electrode, with the solid electrolyte contactingly positioned between the electrodes. Typically, the energy storage devices will have a first current carrier electrically connected to the positive electrode and a second current carrier electrically connected to the negative electrode to provide for energy transfer to and from the device. Ideally, the solid electroyte need only be thick enough to separate the electrodes from contacting each other and therefore can be very thin such as between 0.1 to 0.001 inches (0.3 to 0.003 cm) thick or thinner.

Because the electrolyte is solid, the electrodes can be either solid or liquid. Solid electrodes include but are not limited to lithium, platinum, graphite, carbon, ruthenium, nickel, silver, gold, lead, mercury, zinc, cadium, aluminum, copper and the like. Liquid electrodes include but are not limited to liquid metals such as liquid lithium, liquid metal alloys such a lithium-mercury amalgams and the like.

An advantage of the present invention is that the amorphous compounds have a glass-like morphology and exhibit no grain boundries as compared to crystaline solids. Since no grain boundries exist in the composition of the present invention, mobile cations can move uninterrupted through the composition due to the homogenous morphology of the material.

Depending on the energy storage system and electrodes employed, various types of membranes may also be used between the solid electrolyte and the electrode. For example, conducting rubbers, polymers, celluloses and the like can be placed between the electrode and electrolyte to decrease the internal resistance exhibited at the electrode/electrolyte interface by increasing the surface connection.

SPECIFIC EMBODIMENTS

Example 1

A 12 mm outside diameter fused quartz tube was sealed at one end, cleaned and dried at 225° C. for 24 hours. The quartz tube was then transferred to a Vacuum Atmospheres glove box (with an $N_2$ atmosphere at about 1 atmosphere) to cool. Within the glove box, 0.57 g metallic aluminum spheres, 0.91 g elemental sulfur in powdered form, 1.29 g vacuum distilled $AlCl_3$, 4.05 g CsCl and 0.20 g LiCl were added to the fused quartz cell. The final mixture had the molar ratio of 0.18Li/0.86Cs/1.1Al/1.0S/2.1Cl. The tube was stopped while in the glove box and then removed. The stopper was then removed with the tube being quickly placed on a vacuum line to evacuate the gases within the tube. This step was performed very quickly in order to minimize the possible exposure of the mixture to the air. After about 30 minutes on the vacuum line, the tube was fused shut, enclosing the mixture while still under vacuum. The sealed tube was then placed in a furnace at a temperature of about 500° C. for 48 hours. After 48 hours at 500° C. the tube was rotated at a rate of about 8-10 rpm at 500° C. for an additional 48 hours. Subsequently, the furnace temperature was raised to about 580° C. for approximately 8 hours increased to 610° C. for 24 hours, increased to 710° C. for 42 hours and finally to 780° C. for 48 hours. The tube was cooled to room temperature with the contents being examined visually while still in a sealed tube. The compound was brown in color and had a glass-like appearance.

It is to be understood that the subject invention is not to be limited by the example set forth herein since this has been provided merely to demonstrate operability. The selection of elemental components, compound formulations, component ratios and reaction conditions can be determined from the total specification disclosure provided without departing from the spirit of the invention herein disclosed and described. The scope of this invention includes equivalent embodiments, modifications and variations that fall within the scope of the attached claims.

I claim:

1. A composition of the formula:

wherein:

Y is selected from the group consisting of S and Se;

Z is selected from the group consisting of Cl, Br and I or combinations thereof;

A is selected from the group consisting of Li, Na or K or combinations thereof;

n is a positive integer;

a is a number greater than 0.1, b is a number greater than 0.01 and the sum of a+b equals 1.

2. An ionic conducting solid electrolyte comprising a composition of the formula:

$$[AlYZ_2]_n[A_aCs_b]_n \qquad (I)$$

wherein:

Y is selected from the group consisting of S and Se;

Z is selected from the group consisting of Cl, Br and I or combinations thereof;

A is selected from the group consisting of Li, Na or K or combinations thereof;

n is a positive integer or a combination thereof;

a is a number greater than 0.1, b is a number greater than 0.01 and the sum of a+b equals 1.

3. The composition of claims 1 or 2 wherein Y is S.

4. The composition of claims 1 or 2 wherein Z is Cl.

5. The composition of claims 1 or 2 wherein A is Li.

6. An electrical energy storage device comprising:

(a) a housing;

(b) at least two electrodes, including a positive electrode and a negative electrode, positioned within said housing; and, (c) an ionic conducting solid electrolyte disposed between and electrically contacting said electrodes; and wherein said ionic conducting solid electrolytes comprises a composition of the formula:

$$[AlYZ_2]_n[A_aCs_b] \qquad (I)$$

wherein

Y is selected from the group consisting of S and Se;

Z is selected from the group consisting of Cl, Br and I or combinations thereof;

A is selected from the group consisting of Li, Na or K or combinations thereof;

n is a positive integer;

a is a number greater than 0.1, b is a number greater than 0.01 and the sum of a+b equals 1.

7. The electrical energy storage device of claim 6 further comprising a first current carrier electrically connected to the positive electrode and a second current carrier electrically connected to the negative electrode.

8. The electrical energy storage device of claim 6 wherein Y in formula (I) is S.

9. The electrical energy storage device of claim 6 wherein Z in formula (I) is Cl.

10. The electrical energy storage device of claim 6 wherein A in formula (I) is Li.

* * * * *